June 3, 1952     E. W. GOLDBERG     2,599,382
SLIDE HOLDER
Filed Nov. 13, 1947     2 SHEETS—SHEET 1
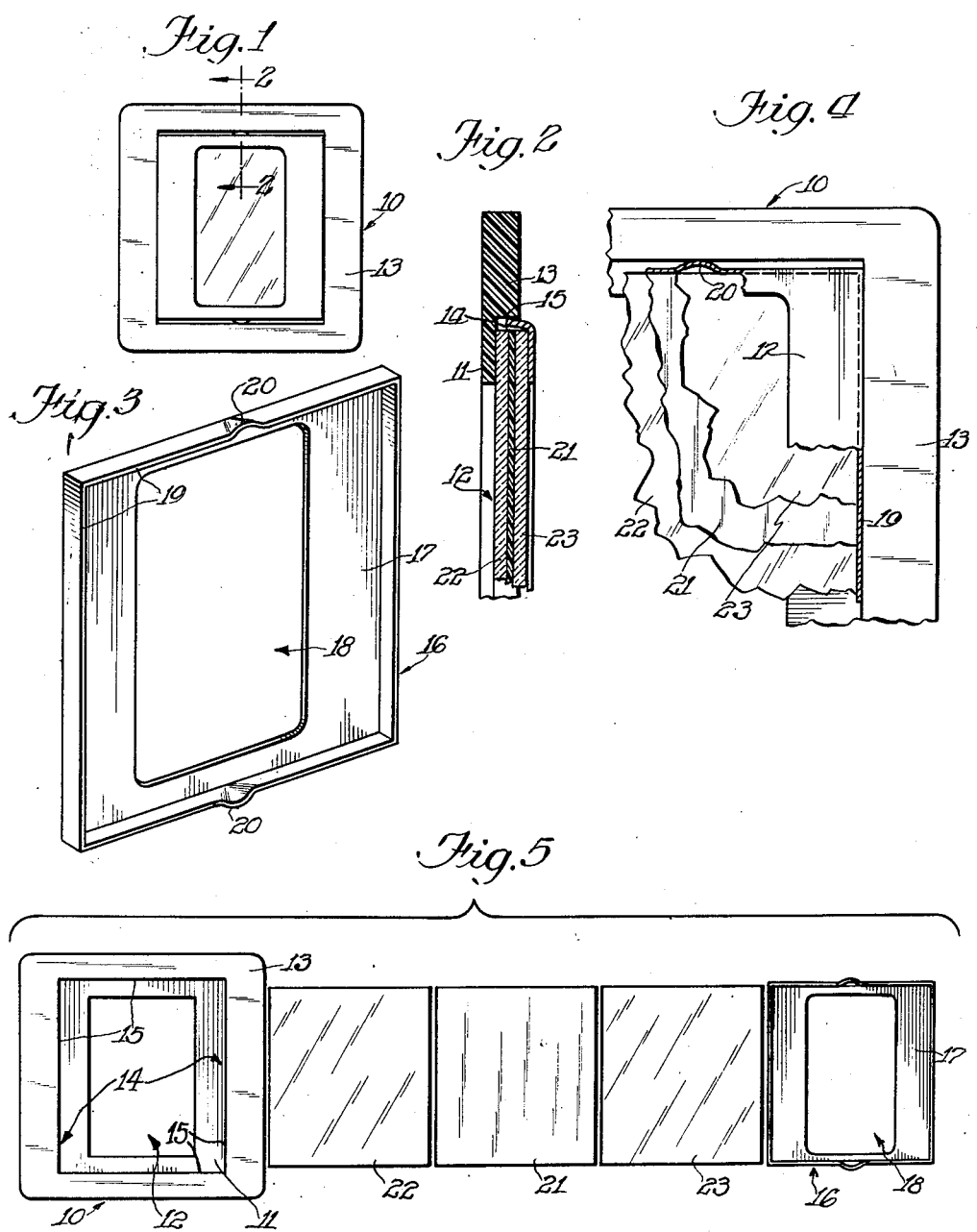
Inventor:
Ernest W. Goldberg
Henry Heck
Attorney.

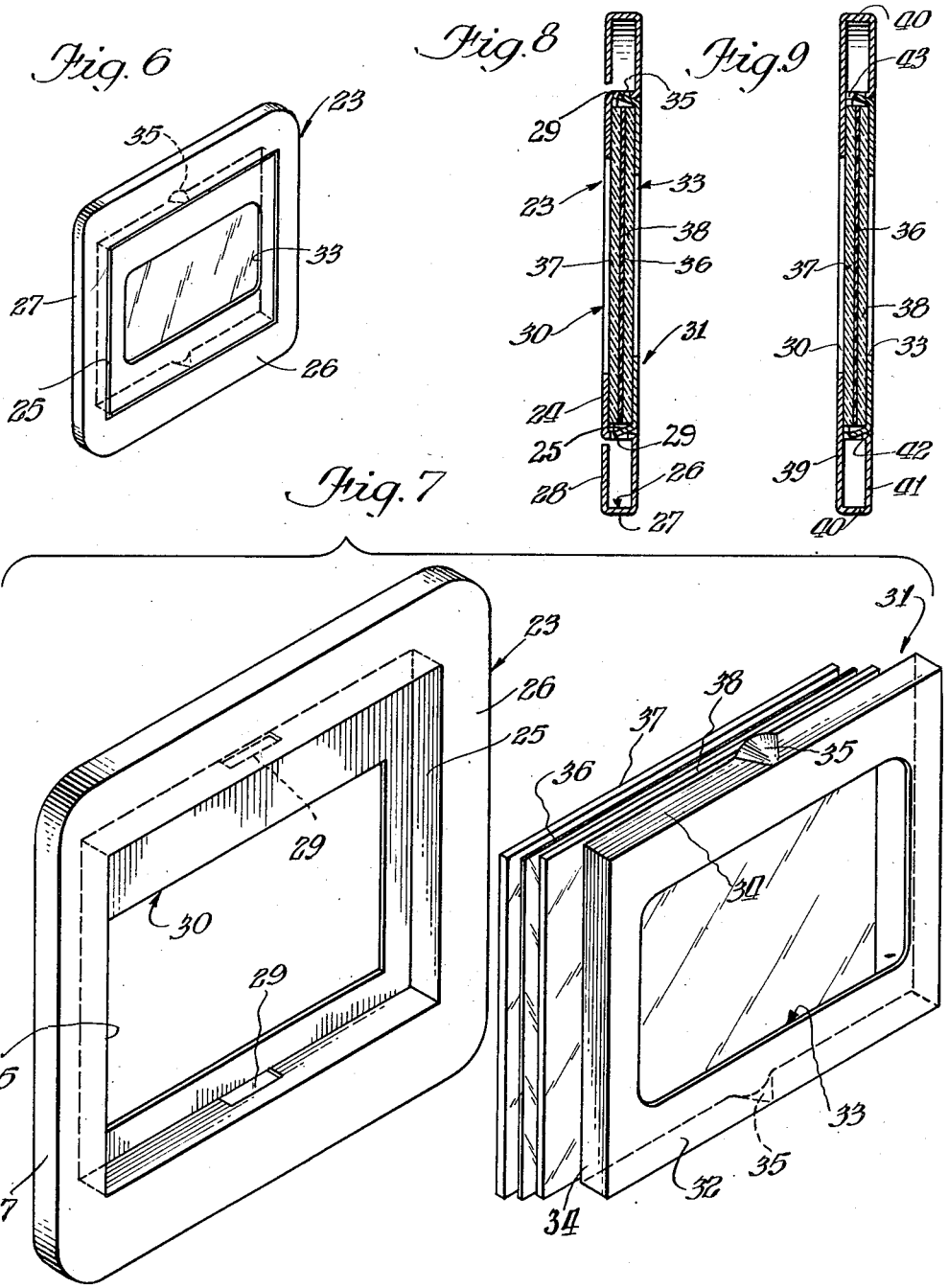

Patented June 3, 1952

2,599,382

UNITED STATES PATENT OFFICE 2,599,382

SLIDE HOLDER

Ernest W. Goldberg, Chicago, Ill.

Application November 13, 1947, Serial No. 785,743

9 Claims. (Cl. 40—152)

The invention relates to holders for film, and slides for use in projection apparatus.

It is an object of the invention to provide a slide holder which is of inexpensive construction and yet highly efficient in use.

A further object constitutes the provision of a film slide wherein the film is held in taut condition and buckling or other unevenness of the film is effectively prevented.

Another object of the invention is to maintain the film under tension while in the slide so that temperature conditions cannot influence the proper position of the film.

It is also an object to provide a slide wherein the film may be quickly installed and removed and its proper positioning in the slide is automatically obtained.

It is a further object of the invention to provide a slide wherein the frame and the holder may be quickly assembled and disassembled.

A still further object constitutes the arrangement of parts tending to enhance the utility and efficiency of a device of the character specified.

With these and other important objects in view which will become apparent from a disclosure of the invention, the latter comprises the means described in the following specification, particularly pointed out in the claims forming a part thereof and illustrated in the drawing, in which Fig. 1 is a rear elevational view of the film slide constructed in accordance with my invention.

Fig. 2 is an enlarged fractional section on the line 2—2 of Fig. 1.

Fig. 3 is an isometric view of a clip used with the slide.

Fig. 4 is an enlarged fractional top plan view of a corner of the slide.

Fig. 5 is an exploded view of the slide.

Fig. 6 is an isometric view of a modified film slide.

Fig. 7 is an enlarged isometric view of the film slide in separated position.

Fig. 8 is a vertical section through the film slide, and

Fig. 9 is a similar section but slightly modified.

Referring to the several views of the drawing, the slide or film holder generally designated at 10 comprises a holder frame made of plastic material and having a front wall 11 (Figs. 2 and 5) substantially of rectangular form and provided with a rectangular opening or window 12 for the passage of light rays from the projecting apparatus.

Along the perimeter of the wall 11 the latter is provided with a reinforced edge portion 13 which extends rearwardly from the wall 11 and defines a shallow chamber 14 of rectangular form bounded by the inner faces 15 of the rim portions 13 and the front wall 11.

Adapted for insertion into the chamber 14 is a companion inner frame or clip generally designated by 16 and comprising a plate 17 formed with a rectangular window opening 18 (Fig. 3) which when the clip is in functional position is in alignment with the opening 12 of the holder frame. The perimetric portions of the plate 17 are bent at right angles thereto and form a flange 19.

As shown in Fig. 3 the flange 19 at the top and bottom of the clip is bent out as at 20 to form a spring boss or presser means of partly conical shape.

In use a transparency 21 is placed between two glass plates 22 and 23 and the assembly is placed in the clip or inner frame.

The dimensions of the glass plates are such that they have preferably a snug or close fit in the clip.

Thereupon the clip and assembly are inserted in the chamber 14 with the springs 20 pressing in the holder to retain the clip.

Attention is called to the fact that the width of the flange 19 is less than the depth of the wall portions or faces 15 so that the film is held under continuous pressure between the glass plates since the free edge of the clip flange does not contact with the holder or chamber wall 11 and only the glass plate 22 contacts therewith. Thus the film 21 is always held in taut condition.

It is evident that the film slide may be easily assembled and disassembled, and yet the film is properly placed and always prevented from buckling due to temperature conditions.

The modification shown in Figs. 6 to 8 embodies a film slide made of metal.

The holder frame 23 is made of sheet metal which is bent to provide a backing plate 24 upturned along its marginal portions to provide flanges 25 thence is bent parallel to the backing plate affording a surrounding border channel or hollow frame section 26. The border section is bent rearwardly parallel to the flange 26 to provide thickness as at flanges 27 and thence inwardly to form extension 28 approximately flush with the backing plate.

The backing plate portion 24 and the flanges 25 form a shallow chamber adapted to receive the clip.

The top and bottom flanges 25 are provided with slots 29 for a purpose hereinafter described.

The backing plate is formed with a large central opening 30.

A clip generally designated at 31 (Fig. 7) comprises a sheet metal 32 formed with a large opening or window 33 which, when the clip and holder frame are assembled, is in registry with the frame opening 30 to permit passage of light rays.

The plate member 32 is bent or upset at the perimeter at right angles thereto to provide flanges 34. The top and bottom flanges 34 are bent or stamped out as at 35 to form holding bosses.

The film or transparency 36 is arranged between glass plates 37 and 38 and the assembly is placed in the clip which is dimensioned so that the assembly is closely seated within the flanges 34.

Thereupon the clip or inner frame is inserted into the chamber of the holder frame and is held therein by the snap action of the springs or bosses 35 which are received in the slots 29 of the frame and securely hold the parts together.

To remove the clip from the holder frame it is only necessary to press one corner of the clip which causes one of the springs 35 to recede from the slots 29 and thereby releases the clip.

Attention is called to the fact that the depth of the flange 34 is less than the depth of the frame flange 25 so that in the assembled position the flange 33 does not contact the backing plate 24. Thus the film 36 is held in taut condition since the glass plates 37 and 38 are subjected to constant pressure while in assembled position.

The modification shown in Fig. 9 merely differs in the construction of the holder frame.

Here the backing plate 39 is larger than the overall dimension of the companion frame member or clip 29, and is bent near the perimeter at right angles to provide flanges 40, which continue inwardly to form border sections 41. The inner ends of sections 41 are bent inwardly in a reentrant sense to form flanges 42 equivalent to the sidewall portions 25 of the embodiment shown in Fig. 8 whereby a chamber is formed.

The top and bottom flanges 42 each have likewise a slot 43 to receive the springs or holding bosses of the clip or inner frame.

Numerous changes and alterations may be made within the spirit of the invention and disclosure, and I do not limit myself to the precise details of construction and arrangement of parts shown, but wish to include all modifications, revisions and alterations, thereof within the scope of the invention, as pointed out in the appended claims.

I claim:

1. In a slide holder, of the type having companion rectangular interfitting frame pieces for securing a plate member therebetween, and registering light openings for the plate, the following improvements, namely: a circumambient marginal flange on one of said frame pieces and securing means therein comprising outwardly projected bosses on opposite marginal flange walls thereof, said bosses having a greater outward projection at the edges of said flange walls and tapering inwardly therefrom to a lesser projection near the juncture of said flange walls with the adjoining body parts of said frame piece, said bosses being adapted to enter the companion frame piece with the greater projection depth thereof foremost, whereby to provide a securing interfit for the frame pieces.

2. Improvements in accordance with claim 1 and further characterized in that the said companion frame piece has slots positioned inwardly of the marginal opening therein in which said first frame piece is received at a depth to be engaged by the aforesaid foremost boss portions of greatest depth to offer a yieldable interlock for said frame pieces.

3. In a slide holder of the class described and including a first frame member having a plate or slide chamber, with an inner circumambient wall, and a second frame member having a circumambient flange receivable in said chamber with said flange telescoping closely into engagement with said inner wall, improvement comprising, to wit: securing means consisting in outwardly projecting bosses of particonical contour situated in said flange, boss beginning at the edge of the flange with a maximum outwardly projecting depth, and tapering inwardly of said edge to a minimum and lesser depth such that the greatest outward projection of said bosses is in the region of the edge of the flange of said second frame member, and is positioned on the latter to enter foremost into interfitting and holding engagement with said inner walls of the first member.

4. A slide holder comprising a sheet metal piece having a central depression constituting a plate chamber and integral marginal portions offset to form a hollow channel circumferential frame about said chamber, and a companion frame telescoping into said chamber.

5. A slide holder comprising a sheet metal piece having marginal portions turned over to form a hollow circumferential frame with a light passage formed in the bottom thereof, and inner circumambient walls of said frame adjacent said opening to define a chamber, and a companion frame with light passage therethrough and circumambient flanges thereabout frictionally engaged with said chamber-defining walls.

6. The construction defined in claim 5 and further characterized in that said flanges of the companion frame have outwardly-projecting bosses communicating inwardly from the edge of the corresponding flange with a greater outward depth of projection at said edge than inwardly therefrom, so that there is a tapering down of depth from the edge of the flange inwardly thereof, the greater depth of the bosses entering said chamber foremost in assembled relation to holdingly engage said chamber walls.

7. A slide holder comprising a main frame member of substantially uniform overall thickness in the form of a metal sheet having a central depression with a window in the bottom thereof and constituting a slide chamber, integral portions of the metal adjoining said chamber being turned over and around to the opposite side of said main member to define a hollow frame about the chamber having a depth about equal to that of the chamber, and an inner frame fitting into said chamber and dimensioned to lie substantially within the body of said main frame.

8. A slide holder made from sheet metal having centrally stamped therein a depression constituting a slide chamber, the bottom of said chamber having a light passage therethrough, the metal bordering the opening into said chamber being turned back toward the outside bottom of said chamber with portions lying in the plane of the chamber bottom, whereby to provide a hollow frame about the chamber and of substantially the same depth as the chamber, whereby the holder has substantially uniform overall thickness to fit into a slide holder, and an inner frame fitting flush with said chamber.

9. A film holder comprising a pair of interfitting frame members one of which constitutes an outer frame, and the other of which constitutes an inner frame member, said outer frame being formed from a plate of thin metal having a central window therein with marginal portions of said metal adjoining said window turned back upon said plate to form a hollow frame surrounding said window and including marginal reentrant flange portions defining the walls of a chamber with said window at the bottom thereof, said inner frame member including a plate having a complementary window surrounded by upturned marginal flanges of a depth corresponding to the depth of said chamber such that the inner frame fits into said chamber to enclose therein a transparency assembly.

ERNEST W. GOLDBERG.

REFERENCES CITED

The following references are of record in the file of this patent:

UNITED STATES PATENTS

| Number | Name | Date |
| --- | --- | --- |
| 1,692,999 | Siegel | Nov. 27, 1928 |
| 2,018,742 | Rasmussen | Oct. 29, 1935 |
| 2,093,746 | White et al. | Sept. 21, 1937 |
| 2,176,283 | Whiteford | Oct. 17, 1939 |